(12) United States Patent
Ranta

(10) Patent No.: US 6,337,977 B1
(45) Date of Patent: Jan. 8, 2002

(54) ROVING VOICE MAIL

(75) Inventor: Tarja-Leena Ranta, Richmond (GB)

(73) Assignee: Ico Services Limited, London (GB)

( * ) Notice: Subject to any disclaimer, the term of this patent is extended or adjusted under 35 U.S.C. 154(b) by 0 days.

(21) Appl. No.: 09/020,037

(22) Filed: Feb. 6, 1998

(30) Foreign Application Priority Data

Feb. 26, 1997 (EP) ............................................ 97301254

(51) Int. Cl.[7] .............................................. H04Q 7/210
(52) U.S. Cl. ...................... 455/413; 455/432; 455/433; 455/427; 455/12.1
(58) Field of Search ................................ 455/412, 413, 455/414, 427, 430, 432, 433, 435, 12.1, 72

(56) References Cited

U.S. PATENT DOCUMENTS 5,506,888 A    4/1996   Hayes et al.
5,889,839 A  *  3/1999  Beyda et al. ............ 379/88.12

FOREIGN PATENT DOCUMENTS

| EP | 0503813 A2 | 9/1992 |
| EP | 0682457 A2 | 11/1995 |
| EP | 0739147 A1 | 10/1996 |
| WO | WO 92/17950 | 10/1992 |

* cited by examiner

*Primary Examiner*—Lee Nguyen

(57) ABSTRACT

In a telephone system providing a voice mail service, a subscriber's voice mail follows the subscriber as he moves. In, for example, a satellite mobile telephone system, a subscriber may roam over wide areas. As he does so he registers sequentially with different satellite access nodes. These nodes may be on different continents. When the subscriber registers with a new satellite access node, the contents of his previous voice mailbox are transferred to a new voice mail box at the new satellite access node. The subscriber's home location register record and the visitor location register record, at the new node, are updated with the number of the new voice mailbox, so that new voice mail can be routed to the correct mailbox.

9 Claims, 3 Drawing Sheets

ROVING VOICE MAIL

FIELD OF THE INVENTION

The present invention relates to method of providing a voice mail service in a mobile telephone network having a plurality of geographically dispersed voice mail storage units associated with respective network switching nodes.

BACKGROUND TO THE INVENTION

The provision of voice mail services is well known in the art of telecommunications. Typically, a voice mail service allows callers to leave a recorded message for a subscriber who is unavailable at the time of the call. The called subscriber can then retrieve the messages at a later time.

A problem arises when voice mail services are provided in telephone systems, for example satellite mobile telephone systems and GSM cellular telephone systems, where a subscriber can roam over a wide area, possibly all over the world. In the case of a satellite mobile telephone system, the subscriber would access the system through different ground stations in different countries or on different continents. In the case of the GSM cellular telephone system and the like, the subscriber roves between services provided by different operators, for instance a UK-based subscriber might take his mobile telephone to Australia and use it with a network there.

In each of the these cases, the subscriber's voice mail must be transferred over long distances each time it is accessed from outside the subscriber's home location. Service providers often use other network's lines for communication over long distances and this ad hoc transfer of voice mail does not promote cost-effective use of such lines. Furthermore, a subscriber who has roamed to another network must enter a long string of digits to access his voice mail in his home network. This has two disadvantages. Firstly, it is difficult for the subscriber to remember the sequence. Secondly, the voice mail service does not have the transparency which roaming is intended to provide.

Known satellite mobile telephone systems include the Inmarsat-M system, the IRIDIUM™ system described in, for example EP-A-0365885, the ICO™ system described in, for example, GB-A-2295296 and the ODYSSEY™ system described in, for example, EP-A-0510789.

SUMMARY OF THE INVENTION

It is an aim of the present invention to overcome the afore-mentioned problems by providing for roving voice mail. In other words, a subscriber's voice mail will follow him around.

According to the present invention, there is provided a method of providing a voice mail service in a mobile telephone network having a plurality of geographically dispersed voice mail storage units associated with respective network switching nodes, the method comprising transmitting the contents of a subscriber's voice mail box in a first voice mail storage unit, associated with a first network switching node, to a voice mail box in a second voice mail storage unit, associated with a second network switching node, said transmission being in response to said subscriber's mobile station registering with the second network switching node, wherein transmittal of the contents of the first voice mail box is effected in reponse to reception, by the first voice mail storage unit, of a voice mail transfer command, the command including a voice mail destination identifier identifying the second voice mail storage unit.

Since, the voice mail is transferred en bloc, a long-distance connection is not required each time a user accesses his voice mail away from his home location. Furthermore, the network control can arrange for the voice mail to be transferred in an economical manner, for instance to ensure that line capacity bought is fully used.

Preferably, the subscriber terminal apparatus is a mobile telephone and the network location of the subscriber terminal apparatus is determined during registration of the subscriber terminal apparatus with the network.

In the case of satellite mobile telephone systems, the user may be on occasion registered with a mobile satellite switching centre other than the one with which he is directly in contact. Accordingly, his voice mail would not be located at the closest node but merely one closer to him than the node which previously stored his voice mail.

Preferably, a method according to the present invention comprises maintaining a database of information relating to a plurality of subscriber mobile stations, the information including the network switching node with which the subscriber's mobile station is registered and a voice mail box identifier; registering the subscriber's mobile station at the second network switching node; updating the database record for said subscriber's mobile station in response to said registration; and transmitting the voice mail transfer command to the first voice mail storage unit. More preferably, the voice mail box identifier stored in the database is altered to identify the second voice mail storage unit when the subscriber's mobile station is subsequently deregistered with second network switching node.

Preferably, the voice mail transfer command is transmitted from the second network switching node.

The present invention finds application in a satellite mobile telephone system, in which case the network switching nodes are preferably comprised in satellite access nodes.

Preferably, a method according to the present invention includes compressing and/or encrypting the voice mail before it is transferred.

Preferably, the timing of the transfer of voice mail is dependent on network traffic level.

The present invention extends to a mobile telephone network including voice mail means operable according to any preceding paragraph of this section.

DESCRIPTION OF THE PREFERRED EMBODIMENTS

Embodiments of the present invention will now be described, by way of example, with reference to the accompanying drawings.

Figure 1:
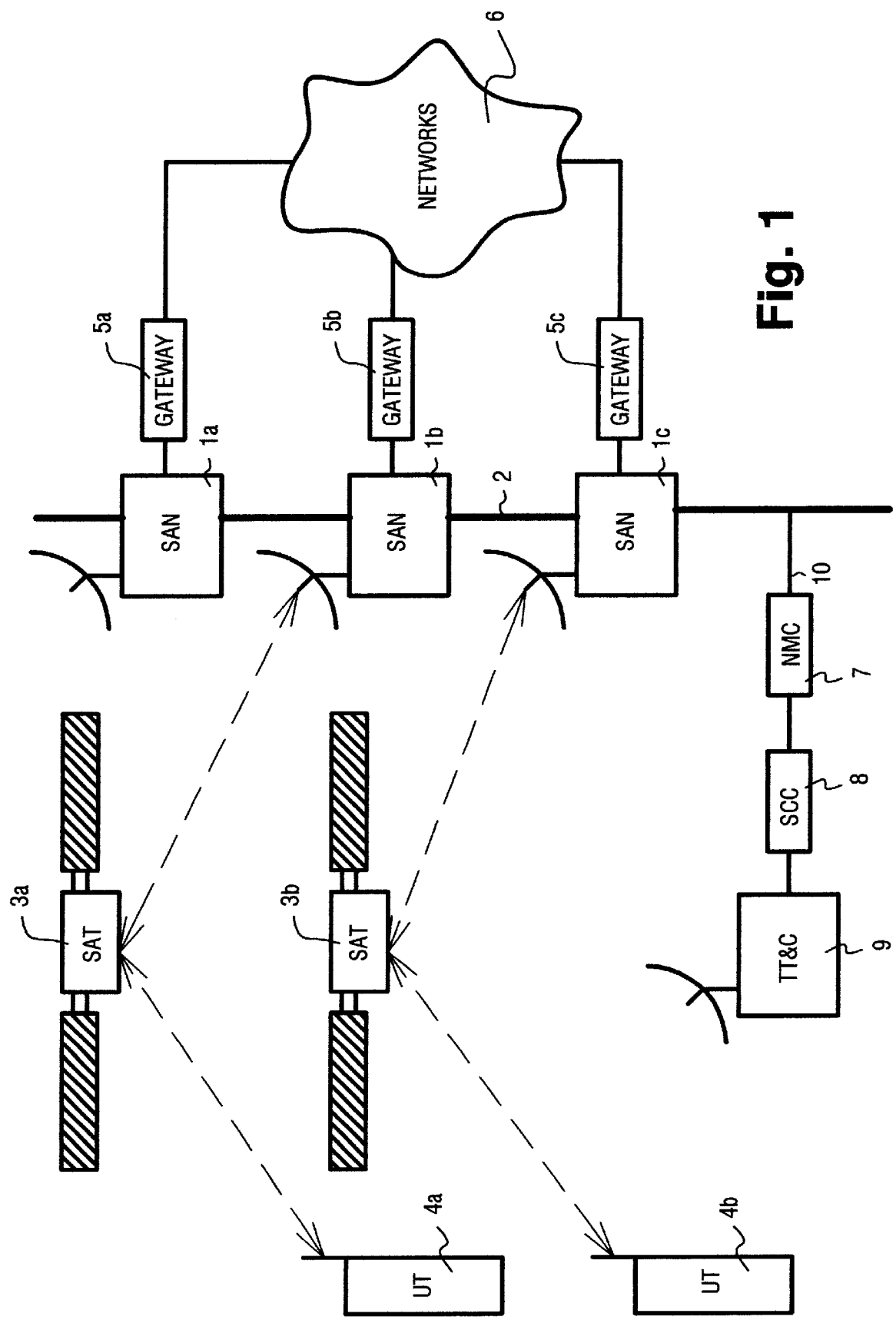
FIG. 1 is a schematic diagram of the physical components of a satellite mobile telephone system.

Referring to FIG. 1, a satellite mobile telephone system comprises a plurality of satellite access nodes (SAN) 1a, 1b, 1c interconnected by a high capacity digital network 2 (hereinafter "the backbone network"), a plurality of satellites 3a, 3b, a plurality of a mobile telephones (UT) 4a, 4b, gateways 5a, 5b, 5c providing connections between the SANs 1a, 1b, 1c and other networks 6, a network management centre (NMC) 7, a satellite control centre (SCC) 8 and a tracking, telemetry and control station (TT&C) 9. The NMC 7, the SCC 8 and the TT&C 9 are interconnected by a lower capacity digital network 10 which is also connected to the backbone network 2. The other networks 6 comprise the public switched telephone network (PSTN), cellular telephone networks and the like.

The SCC 8 and the TT&C 9 control the operation of the satellites 3a, 3b, for instance setting transmit power levels and transponder input tuning, as directed by the NMC 7. Telemetry signals from the satellites 3a, 3b are received by the TT&C 9 and processed by the SCC 8 to ensure that the satellites 3a, 3b are functioning correctly. During a telephone call, a UT 4a, 4b communicates with a satellite 3a, 3b via a full duplex channel comprising a downlink channel and an uplink channel. The channels comprise TDMA time slots on frequencies allocated on initiation of the call.

The satellites 3a, 3b are in non-geostationary orbits and comprise generally conventional satellites, such as the known Hughes HS601 model, and may include features as disclosed in GB-A-2288913. Each satellite 3a, 3b is arranged to generate an array of beams covering a footprint beneath the satellite, each beam including a number of different frequency channels and time slots, as described in GB-A-2293725.

The satellites 3a, 3b are arranged in a constellation in sufficient numbers and suitable orbits to cover a substantial area of the globe, preferably to give full, continuous global coverage. For example, 10 or more satellites may be provided in two mutually orthogonal intermediate circular orbits at an altitude of 10500 km. However, larger numbers of lower satellites may be used, as disclosed in. EP-A-0365885 or other publications relating to the IRIDIUM system.

Figure 2:
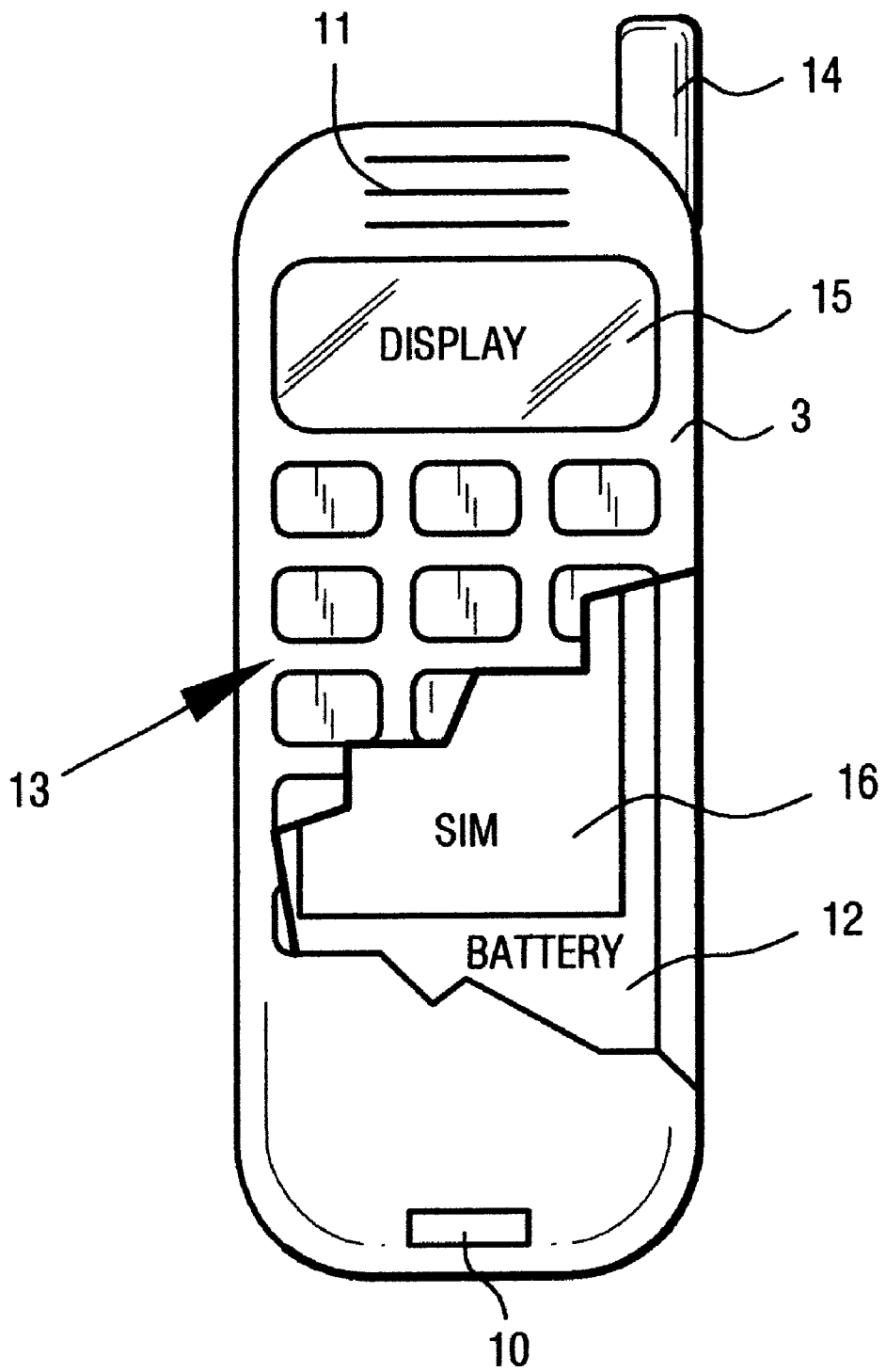
FIG. 2 shows a mobile telephone partially cut away.

Referring to FIG. 2, a UT 4 is generally similar to the units presently available for GSM networks and comprises a codec, a controller, a microphone 10, a loudspeaker 11, a battery 12, a keypad 13, a radio frequency interface, an antenna 14, a display 15 and subscriber identification module (SIM) smart card 16.

The codec comprises a low bit-rate coder, which generates a speech bit stream at 3.6 kbits/s, together with a channel coder, which applies error correction codes to the speech bit stream to produce an encoded bit stream at 4.8 kbits/s. The low bit-rate coder is a linear predictive coder. The channel coder uses Viterbi coding. The codec also comprises complementary decoders.

The SIM 16 includes a processor and a non-volatile memory which stores data identifying the subscriber and data for use in encrypted communication.

Figure 3:
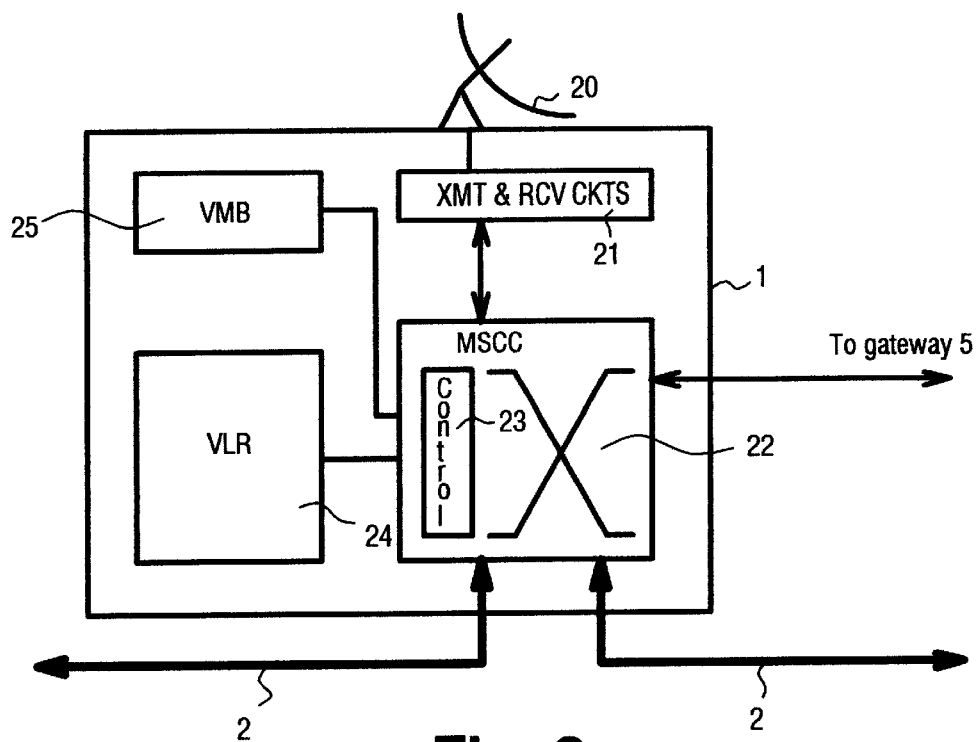
FIG. 3 is a schematic diagram of a satellite access node as shown in FIG. 1.

Referring to FIG. 3, a SAN 1 comprises a dish antenna 20 mounted for tracking satellites, transmitter and receiver circuits 21 including amplifiers, multiplexers, demultiplexers and codecs, a mobile satellite switching centre (MSSC) 22 including a controller 23, a visitor location register database (VLR) 24 and a voice mail box unit (VMB) 25. The MSSC 22 is coupled for communications signals to the backbone network 2, to a gateway and to the transmitter and receiver circuits 21. The controller 23 is coupled for data signals to the VLR 24 and the VMB 25 and may also send and receive data signals via the backbone network 2.

The controller 23 responds to addresses on incoming communications signals, from the antenna 20, the gateway and the backbone network 2, by controlling the MSSC 22 to output the communications signals on the appropriate paths to their destinations, i.e. the antenna 20, the gateway or the backbone network 2.

The VLR 24 maintains a record of each of the subscribers registered with the SAN 1. The VMB 25 provides storage space for voice mail messages for subscribers.

Figure 4:
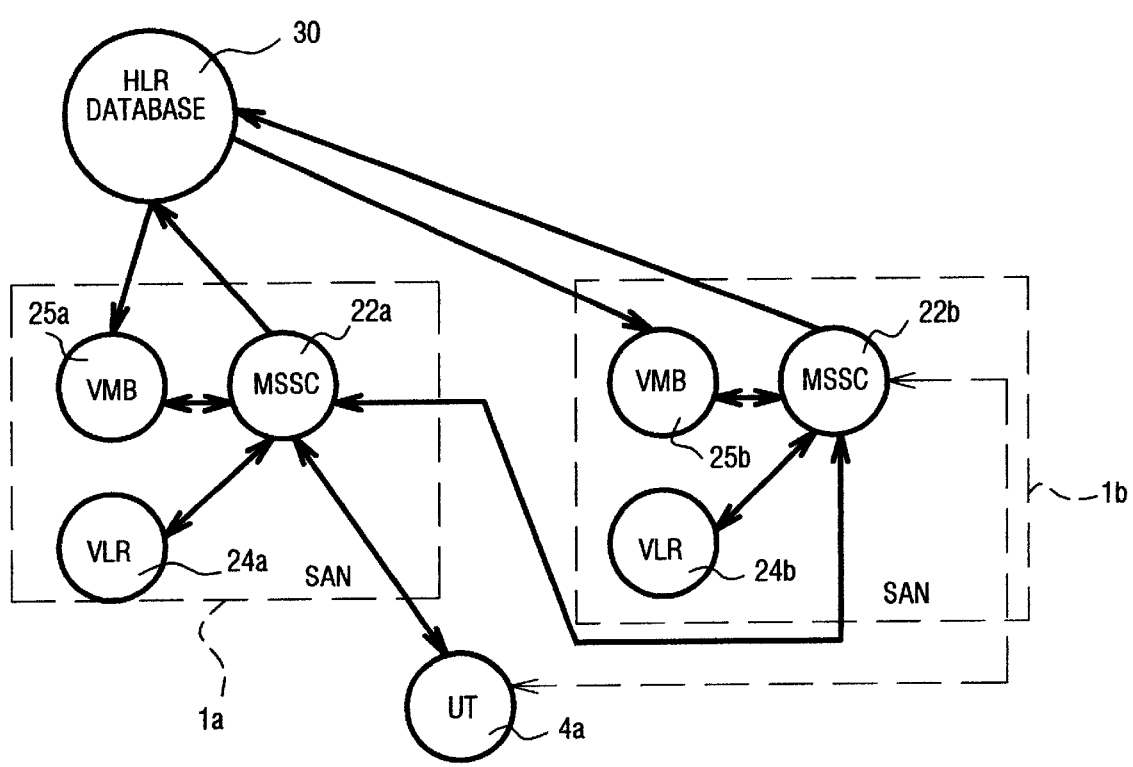
FIG. 4 is a data flow diagram for the system shown in FIG. 1.

Referring to FIG. 4, a database 30, called the home location register HLR), contains records relating to each UT 4. The record contains the UT's identity (International Mobile Subscriber Identity or IMS), the current status of the UT (whether it is "local" or "global" as will be described in greater detail below), the geographical position of the UT, the home MSSC with which the UT is registered (to enable billing and other data to be collected at a single point), the currently active SAN with which the UT is in communication via a satellite, an individual encyphering key, the address of an associated VMB location, typically in the form of an MSISDN number and call forwarding information.

The HLR 30 may be located in the NMC 7 (see FIG. 1) or may be distributed among the SANs 1a, 1b, 1c (see FIG. 1).

Referring to FIGS. 1 to 4, a UT 4a may be registered with one of two distinct statuses; "local" in which the UT 4a is permitted to communicate only through one local area or part of the satellite system network, and "global", which entitles the UT 4a to communicate through any part of the satellite mobile telephone system.

The UT 4a performs an automatic registration process, of the kind well known in the art of cellular terrestrial communications, on each occasion the UT 4a is used for an outgoing call, the UT 4a is switched on and periodically whilst the UT 4a is operating. As is conventional, the registration process takes the form of transmitting of a signal identifying the UT 4a (e.g. by transmitting its telephone number on a common hailing or signalling channel). The transmitted signal is picked up by one or more of the satellites 3a, 3b. Under normal circumstances, the signal is picked up by a plurality of satellites 3a, 3b, and the received signal strength or time of arrival are transmitted, together with the identity of the UT 4a and the identity of the satellite 3a, 3b receiving the signal, to the HLR 30 via the MSSCs 22a, 22b of the SANs 1a, 1b for which the satellites 3a, 3b are in communication.

The HLR 30 calculates, on the basis of the received-signal arrival times, the terrestrial position of the UT 4a which is then stored in the UT's record. The identity of the SAN 1a, 1b, most suitable for communicating with the UT 4a is also stored. This is typically found by comparing the stored position of the UT 4a with the positions of each of the SANs 1a, 1b, and selecting the nearest. However, account may also or instead be taken of the strengths of the signals received via the satellites 3a, 3b or of other factors such as network congestion which may result, in borderline cases, in the selection of a SAN 1a, 1b, 1c which is not geographically closest to the UT 4a. The identity of the allocated SAN 1a is then stored in the UTs record in the HLR 3, if the allocated SAN has changed. If the allocated SAN 1a is not that previously allocated, the HLR 30 modifies the voice mail box location field of the UTs record to identify a VMB location at the allocated SAN 1a.

Once the HLR record has been updated, it is copied down to the VLR 24a of the selected SAN 1a and the VMB 25b of the previous SAN 1b is informed that the UT 4 has registered with another SAN 1a. The VMB 25b then compresses and encrypts the voice mail for the UT 4a and sends it to the MSSC 22a of the allocated SAN 1a, via the MSSC 22b. The message received by the MSSC 22a includes the new VMB location for the voice mail and is transferred to the VMB 25*a*, where it is decrypted, expanded and stored, by the MSSC 22*a*.

The HLR voice mail field (MSISDN code) comprises a country code, a network operator code, a SAN code and a code unique to the UT 4*a*. When the UT 4*a* registers at a new SAN 1*a*, only the SAN code of the voice mail field changes.

Thus, whenever a subscriber registers at a new SAN 1*a*, 1*b*, 1*c*, his voice mail is automatically transferred to the SAN 1*a*, 1*b*, 1*c* with which he is registered. When a subscriber wishes to access his voice mail, the MSSC 22*a* need not retrieve the voice mail from another SAN 1*a*, 1*b*, 1*c* but need only retrieve the mail from the local VMB location identified by the subscriber's UT's record in the VLR 24*a*.

Another embodiment of the present invention will now be described, again with reference to FIGS. 1 to 4.

When a UT 4*a* registers, its HLR record is updated as described above save that the voice mail field is not changed. Once the HLR record has been updated, it is copied down to the VLR 24*a* of the selected SAN 1*a*. The MSSC 22*a* notes that the voice mail MSISDN indicates the previous SAN 1*b* and generates a new voice mail address identifying a location in the VMB 25*a*. The VMB 25*b* of the previous SAN 1*b* is informed that the UT 4 has registered with another SAN 1*a* and is commanded by the new MSSC 22*a* to send the contents of the old voice mailbox to the new MSSC 22*a*. The VMB 25*b* then compresses and encrypts the voice mail for the UT 4*a* and sends it to the MSSC 22*a* of the allocated SAN 1*a*, via the MSSC 22*b*. The stored voice mail messages received by the MSSC 22*a* are transferred to the VMB 25*a*, where it is decrypted, expanded and stored, in the new voice mail location.

When the UT 4*a* deregisters from the network, the current MSSC 22*a* signals the MSISDN for the current voice mail location to the HLR 30 which then updates the voice mail field of the subscriber's HLR record.

A further embodiment of the present invention will now be described, again with reference to FIGS. 1 to 4.

When a UT 4*a* registers, its HLR record is updated as first described above save that the voice mail field is not changed. Once the HLR record has been updated, it is copied down to the VLR 24*a* of the selected SAN 1*a*. The MSSC 22*a* notes that the voice mail MSISDN indicates the previous SAN 1*b* and generates a new voice mail address identifying a location in the VMB 25*a*. At this point, the VLR 24*a* stores both the new and the old voice mail addresses. Accordingly, if the user wishes to access his voice mail, the MSSC 22*a* will attempt to retrieve messages from both the previous VMB 25*b* and the new VMB 25*a*.

After the VLR 24*a* has been loaded with the data from the HLR 30, the MSSC 22*a* informs the new VMB 25*a* of the old voice mail address. The new VMB 25*a* then commands the previous VMB 25*b* to send the contents of the old voice mailbox to the new MSSC 22*a*. The VMB 25*b* then compresses and encrypts the voice mail for the UT 4*a* and sends it to the MSSC 22*a* of the allocated SAN 1*a*, via the MSSC 22*b*. The stored voice mail messages received by the MSSC 22*a* are transferred to the VMB 25*a*, where it is decrypted, expanded and stored, in the new voice mail location. If the transfer is successful, the new VMB 25*b* informs the MSSC 22*a* which then deletes the record of the previous voice mail address from the new VLR 24*a*.

When the UT 4*a* deregisters from the network, the current MSSC 22*a* signals the MSISDN for the current voice mail location to the HLR 30 which then updates the voice mail field of the subscriber's HLR record. If deregistration occurs before the voice mail is transferred successfully, both voice mail addresses are communicated to the HLR 30.

Since both voice mail addresses are stored until the voice mail messages have been transferred, the VMB 25*b* may notify the NMC 7 that it has voice mail to transfer and report the amount of data to be transferred and its destination. The NMC 7 then determines when a link to the destination is to be opened, for some other time critical purpose, and signals to the VMB 25*b* that it should dispatch the voice mail when the link opens.

Two cases of call forwarding to a voice mailbox will now be described.

In a first case, the subscriber is not active or registered in the satellite mobile telephone system. When a call to a UT 4 enters the satellite mobile telephone network via a gateway 5*a* (see FIG. 1), the receiving MSSC 22*a* requests the UT's current location from the HLR 30. If the UT 4 is not active in the network, the HLR 30 replies with notification that the UT 4 is not active in the network and, if call forwarding unconditional (CFU) is activated for the UT4, CFU information and the MSISDN number (i.e. voice mailbox address) of the UT's mailbox. The call is then routed from the MSSC 22*a* to the called subscriber's current VMB 25*b*.

In a second case, a call originates with a UT 4 and arrives at an MSSC 22*a*. The MSSC 22*a* again requests the called UT's location. The HLR 30 replies with this information, identifying a specific MSSC 22*b*. The call is then connected to the MSSC 22*b* identified by the HLR 30. The call control process at this MSSC 22*b* may determine that the called UT 4 is busy or unreachable due to a poor radio path. The called subscriber may have specified that, in these cases, call forwarding should take place. If call forwarding is to take place, the called UT's mailbox MSISDN number is retrieved from the local VLR 24*b* and the call is forwarded to that number, which will usually be in the local VMB 25*b*.

It will be appreciated that the foregoing embodiment may be modified for use in GSM networks. In such a system, a subscriber's UT may be registered with a UK network which provides a voice mail service. The subscriber may then travel to Australia and register his UT with a network there. When the UT registers with the Australian network, the HLR record will be copied from the UK network to the Australian network, as in the case of the HLR to VLR transfer described above, and the HLR will instruct the UK VMB to send the subscriber's voice mail messages to a VMB in the Australian network.

Since, the subscriber's voice mail has been transferred to the voice mail system of the, in this case, Australian network, the user need only enter the short local voice mail access number, rather than the long number required in known systems.

What is claimed is:

1. A method of providing a voice mail service in a mobile telephone network having first and second voice mail storage units associated respectively with first and second geographically widely separated network switching nodes, the method comprising:

receiving a voice mail transfer command at said first voice mail storage unit; and in response to reception of said voice mail transfer command, dispatching the contents of a voice mail box for a subscriber, located in the first voice mail storage unit to a voice mail box in the second voice mail storage unit;

wherein said voice mail transfer command includes a voice mail destination identifier identifying the second voice mail storage unit to the first voice mail storage unit and is indicative of the transfer of registration of a subscriber's mobile station from said first switching node to said second network switching node.

2. A method as in claim 1, further comprising:

maintaining a database of information relating to a plurality of subscriber mobile stations, the information including the network switching node with which the subscriber's mobile station is registered and a voice mail box identifier;

registering the subscriber's mobile station at the second network switching node;

updating the database record for said subscriber's mobile station in response to said registration; and transmitting the voice mail transfer command to the first voice mail storage unit.

3. A method as in claim 2, wherein the voice mail box identifier stored in the database is altered to identify the second voice mail storage unit when the subscriber's mobile station is subsequently deregistered with second network switching node.

4. A method as in claim 1, wherein the voice mail transfer command is transmitted from the second network switching node.

5. A method as in claim 1, wherein the network switching nodes are comprised in satellite access nodes of a satellite mobile telephone system.

6. A method as in claim 1, including compressing the voice mail before it is transferred.

7. A method as in claim 1, including encrypting the voice mail before it is transferred.

8. A method as in claim 1, wherein the timing of the transfer of voice mail is dependent on network traffic level.

9. A mobile telephone network including voice mail means operable as in claim 1.

* * * * *